US012008922B2

(12) United States Patent
Palmer et al.

(10) Patent No.: US 12,008,922 B2
(45) Date of Patent: Jun. 11, 2024

(54) SYSTEMS AND METHODS FOR COMPARING DRIVING PERFORMANCE FOR SIMULATED DRIVING

(71) Applicant: SmartDrive Systems, Inc., Westlake, TX (US)

(72) Inventors: Jason Palmer, Carlsbad, CA (US); Reza Ghanbari, San Diego, CA (US); Nicholas Shayne Brookins, Encinitas, CA (US); Slaven Sljivar, San Diego, CA (US); Mark Freitas, San Diego, CA (US); Barry James Parshall, Portland, OR (US); Daniel Andrew Deninger, Carlsbad, CA (US); Behzad Shahrasbi, San Diego, CA (US); Mojtaba Ziyadi, San Diego, CA (US)

(73) Assignee: SmartDrive Systems, Inc., Westlake, TX (US)

( * ) Notice: Subject to any disclaimer, the term of this patent is extended or adjusted under 35 U.S.C. 154(b) by 734 days.

(21) Appl. No.: 16/025,799

(22) Filed: Jul. 2, 2018

(65) Prior Publication Data
US 2020/0005662 A1    Jan. 2, 2020

(51) Int. Cl.
   *G09B 9/052*   (2006.01)
   *B60W 40/09*   (2012.01)
   *B60W 50/14*   (2020.01)
   *G08G 1/16*   (2006.01)

(52) U.S. Cl.
CPC ............ *G09B 9/052* (2013.01); *B60W 40/09* (2013.01); *B60W 50/14* (2013.01); *G08G 1/167* (2013.01)

(58) Field of Classification Search
CPC .... G09B 19/167; G09B 9/052; G05D 1/0088; G05D 1/0061; B60W 40/09; B60W 50/14; G08G 1/167
See application file for complete search history.

(56) References Cited

U.S. PATENT DOCUMENTS 6,888,622 B2   5/2005   Shimomura
8,297,977 B2   10/2012   Freund
8,626,565 B2   1/2014   Petroff
(Continued)

FOREIGN PATENT DOCUMENTS

WO   2017195120   11/2017

OTHER PUBLICATIONS

Best Andrew et al: "AutonoVi: Autonomous vehicle planning with dynamic maneuvers and traffic constraints", 2017 IEEE/RSJ International Conference on Intelligent Robots and Systems (IROS), IEEE, Sep. 24, 2017 (Sep. 24, 2017), pp. 2629-2636, XP033266238, DOI: 10.1109/IROS.2017.8206087 [retrieved on Dec. 13, 2017] * p. 2629 * p. 2631-p. 2635.

*Primary Examiner* — Jack Yip
(74) *Attorney, Agent, or Firm* — Esplin & Associates, PC

(57) ABSTRACT

This disclosure relates to a system that determines driving performance by a vehicle operator for simulated driving of a simulated vehicle in a simulation engine. Individual vehicle event scenarios correspond to vehicle events. Individual simulation scenarios correspond to individual vehicle event scenarios. A vehicle operator, e.g., an autonomous driving algorithm, operates the simulated vehicle in the simulation engine for a set of simulation scenarios. One or more metrics quantify the performance of the vehicle operator based on simulated results.

16 Claims, 5 Drawing Sheets

(56) References Cited

U.S. PATENT DOCUMENTS

| | | |
|---|---|---|
| 9,141,109 B1 | 9/2015 | Kamata |
| 9,147,353 B1 | 9/2015 | Slusar |
| 9,594,371 B1 | 3/2017 | Palmer |
| 10,083,551 B1 | 9/2018 | Schmitt |
| 10,818,102 B1 | 10/2020 | Freitas |
| 2007/0048690 A1* | 3/2007 | Stricek .................... G09B 9/05 434/29 |
| 2007/0132773 A1 | 6/2007 | Plante |
| 2007/0241882 A1 | 10/2007 | Panttaja |
| 2008/0111666 A1 | 5/2008 | Plante |
| 2008/0215202 A1 | 9/2008 | Breed |
| 2010/0191411 A1 | 7/2010 | Cook |
| 2012/0256770 A1 | 10/2012 | Mitchell |
| 2013/0289873 A1 | 10/2013 | Mitchell |
| 2014/0094992 A1 | 4/2014 | Lambert |
| 2014/0136414 A1* | 5/2014 | Abhyanker .......... G05D 1/0011 701/25 |
| 2014/0188776 A1 | 7/2014 | Shuster |
| 2015/0088335 A1 | 3/2015 | Lambert |
| 2015/0134226 A1 | 5/2015 | Palmer |
| 2015/0178998 A1 | 6/2015 | Attard |
| 2015/0197246 A1 | 7/2015 | Nagasaka |
| 2015/0254781 A1 | 9/2015 | Binion |
| 2015/0316386 A1 | 11/2015 | Delp |
| 2016/0146618 A1 | 5/2016 | Caveney |
| 2016/0210382 A1* | 7/2016 | Alaniz ................. G09B 19/167 |
| 2017/0115378 A1 | 4/2017 | Haghighi |
| 2017/0123422 A1* | 5/2017 | Kentley .................. B60L 15/20 |
| 2017/0269606 A1 | 9/2017 | Kawabata |
| 2017/0349172 A1 | 12/2017 | Kubota |
| 2018/0005527 A1 | 1/2018 | Bostick |
| 2018/0190124 A1 | 7/2018 | Kim |
| 2018/0201264 A1 | 7/2018 | Schoenly |
| 2018/0224857 A1 | 8/2018 | Yang |
| 2018/0309592 A1* | 10/2018 | Stolfus ................. H04L 43/062 |
| 2019/0088135 A1 | 3/2019 | Do |
| 2019/0146492 A1* | 5/2019 | Phillips ................. G09B 19/16 701/23 |
| 2019/0163182 A1* | 5/2019 | Li ........................... G06F 30/20 |
| 2019/0241198 A1* | 8/2019 | Mori ....................... G08G 1/16 |
| 2019/0265712 A1 | 8/2019 | Satzoda |
| 2019/0294167 A1* | 9/2019 | Kutila ................... G08G 1/091 |
| 2020/0183387 A1 | 6/2020 | Heit |
| 2022/0005291 A1* | 1/2022 | Konrardy ............... G07C 5/008 |

\* cited by examiner

SYSTEMS AND METHODS FOR COMPARING DRIVING PERFORMANCE FOR SIMULATED DRIVING

FIELD

The systems and methods disclosed herein are related to determining driving performance by a vehicle operator for simulated driving of a simulated vehicle in a simulation engine. In particular, simulation scenarios based on vehicle events are simulated, and the simulated vehicle is operated by the vehicle operator, which may be an autonomous driving algorithm.

BACKGROUND

Systems and methods to rate the performance of a vehicle operator are known. For example, new drivers have to take a test to get a driver's license. Systems and methods to simulate the experience of driving a vehicle are known.

SUMMARY

One aspect of the disclosure relates to a system configured to determining driving performance by a vehicle operator for simulated driving of a simulated vehicle in a simulation engine. Simulations may be based on real-life driving situations, such as detected vehicle events, on hypothetical driving situations, and/or on other driving situations, as well as combinations thereof. Vehicle events may be detected by individual vehicles. The individual vehicles may form a fleet of vehicles, including a first vehicle, a second vehicle, a third vehicle, and so forth.

Individual vehicles may include a set of resources for data processing and/or electronic storage, including but not limited to persistent storage. As used herein, transmission and/or distribution of information may be considered a data processing function. As used herein, the terms data and information may be used interchangeably. Individual vehicles may include a set of sensors configured to generate output signals conveying information related to one or both of the physical surroundings of the individual vehicles and/or operating conditions of the individual vehicles. Individual vehicles may communicate with each other and/or with a computing server. The system may include one or more sets of resources, one or more sets of sensors, a computing server (also referred to as centralized server, centralized cloud server, or simulation server), and/or other components.

One or more components of the system may include one or more processors and/or other mechanisms/components for processing information. For example, a set of resources included in and/or carried by an individual vehicle may include one or more processors. For example, the computing server may include one or more processors. In some implementations, other vehicle-specific components, such as, by way of non-limiting example, a vehicle event recorder configured to detect vehicle events may include one or more processors. In some implementations, some or all of the processors may be configured via machine-readable instructions to perform various functions. As used herein, the term "processor" is used interchangeably with the term "physical processor."

A set of resources included in and/or carried by an individual vehicle may include one or more processors, electronic storage, a transceiver, a set of sensors, and/or other components. The first vehicle may carry a first set of resources. The second vehicle may carry a second set of resources, and so forth. The first set of resources may include a first transceiver. The second set of resources may include a second transceiver, and so forth.

Transceivers may be configured to transfer and/or receive information to and/or from other elements of the system, including but not limited to other vehicles (or components carried by other vehicles), the computing server, and/or other components. In some implementations, transceivers may be configured to transfer and/or receive information wirelessly, and/or otherwise provide resources for the distribution of information. For example, a transceiver may be configured to receive executable code, queries, and/or other information. For example, a transceiver may be configured to transmit results from executable code, responses to queries, information regarding detected vehicle events, information regarding physical surroundings, and/or other information, e.g., to a computing server. In some implementations, transceivers may be configured to obtain, measure, and/or otherwise determine one or more conditions related to data transmissions.

For example, one or more current local data transmission conditions may include a current bandwidth (e.g., in MB/s), a current transmission protocol (e.g., LTE™, 3G, 4G, 5G, Wi-Fi™, etc.), a current transmission cost (e.g., in $/MB), and/or other conditions.

A set of sensors may be configured to generate output signals conveying information. In some implementations, the generated information may be related to one or both of the physical surroundings of individual vehicles and/or operating conditions of individual vehicles. An individual set of sensors may be carried by an individual vehicle. The generated information may include timing information, location information, positional information, (vehicle) operator information, traffic information, roadway information, weather information, visibility information, and/or other information. In some implementations, generated information may be associated with timing information (e.g., from a timer), location information, (vehicle) operator information, and/or other information.

In some implementations, timing information may associate and/or otherwise relate the generated output signals with one or more moments of generation by one or more particular sensors. For example, timing information may include time stamps that indicate moments of generation. A set of time stamps or moments in time may form a timeline. In some implementations, location information may associate and/or otherwise relate the generated output signals with one or more locations of generation (or, locations at the moment of generation) by one or more particular sensors. In some implementations, the operator information may associate and/or otherwise relate the generated output signals with individual vehicle operators at the moments of generation. In some implementations, a particular output signal may be associated with a particular vehicle operator. In some implementations, a set of resources may be configured to store generated information, timing information, location information, operator information, and/or other information, e.g. in electronic storage.

In some implementations, a sensor may be configured to generate output signals conveying information related to the operation of the vehicle (which may include information related to one or more operating conditions of the vehicle). Information related to the operation of the vehicle may include feedback information from one or more of the mechanical systems of the vehicle, and/or other information. In some implementations, at least one of the sensors may be a vehicle system sensor included in an engine control module (ECM) system or an electronic control module (ECM) system of the vehicle. In some implementations, one or more sensors may be carried by the vehicle. The sensors of a particular vehicle may be referred to as a set of sensors. An individual sensor may be vehicle-specific.

Individual sensors may be configured to generate output signals conveying information, e.g., vehicle-specific information. The information may include visual information, motion-related information, position-related information, biometric information, and/or other information. In some implementations, one or more components of the system may determine one or more parameters that are measured, derived, estimated, approximated, and/or otherwise determined based on one or more output signals generated by one or more sensors.

Sensors may include, by way of non-limiting example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, global positioning system sensors, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "motion sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of the system.

Individual sensors may include image sensors, cameras, and/or other sensors. As used herein, the terms "camera" and/or "image sensor" may include any device that captures images and/or other visual information, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. Information captured by one or more sensors may be marked, time-stamped, annotated, and/or otherwise processed such that information captured by other sensors can be synchronized, aligned, annotated, and/or otherwise associated therewith. Output signals generated by individual image sensors (and/or information based thereon) may be stored and/or transferred in electronic files.

In some implementations, an image sensor may be integrated with electronic storage such that captured information may be stored, at least initially, in the integrated embedded storage of a particular vehicle. In some implementations, one or more components carried by an individual vehicle may include one or more cameras. For example, a camera may include one or more image sensors and electronic storage media. In some implementations, an image sensor may be configured to transfer captured information to one or more components of the system, including but not limited to remote electronic storage media, e.g. through "the cloud." In some implementations, the captured information may be analyzed and/or otherwise processed to detect and/or extract information, and subsequently the detected and/or extracted information may be transferred to and/or stored by one or more components of the system. For example, captured information may be analyzed using computer vision techniques such that information related to the physical surroundings of an individual vehicle may be extracted from the captured information. Advantageously, extracted information may be compressed into a much smaller amount of information than the originally captured information. For example, captured information of a sufficiently high resolution may be analyzed using computer vision techniques to determine the make and model (and/or size, color, license plate, characteristics of the vehicle operator, number of passengers, apparent damage on the visible side, etc. etc.) of a vehicle passing in the adjacent lane. This determined information can be stored in a small amount of memory, which may be much smaller than the amount that would be needed to store the original captured information.

The system may be coupled to individual vehicles. For example, the system may be communicatively coupled to individual vehicles and/or to components carried by individual vehicles, including but not limited to transceivers. For example, components of the system may be configured to communicate through one or more networks. The one or more networks may, by way of non-limiting example, include the internet. In some implementations, the one or more networks may include a cellular network and/or another communication grid.

The computing server may include one or more processors. The computing server may be remote, separate, and/or discrete from the fleet of vehicles. The one or more processors may be configured via machine-readable instructions to perform various functions. The computing server may be configured to facilitate presentation of an interface to a user and/or vehicle operator, including but not limited to a (third party and/or autonomous) vehicle operator. The interface may be configured to facilitate interaction between one or more users, vehicle operators, and/or the computing server. For example, the interface may be configured to receive input from a vehicle operator. The computing server may be further configured to transmit information based on received input and/or other received information to some vehicles in the fleet or to all vehicles of the fleet. Information from individual vehicles, including but not limited to responses, results, detected vehicle events, physical surroundings, and/or other information generated by individual vehicles, may be transferred to, received by, and processed, analyzed, and/or presented by the computing server.

In some implementations, a set of resources included in and/or carried by an individual vehicle may include an event recorder (also referred to as vehicle event recorder). An event recorder may be configured to generate, detect, identify, capture, and/or record information related to the operation and/or the physical surroundings of a vehicle. Such information may include, by way of non-limiting example, information related to and/or based on vehicle events. An event recorder may be configured to off-load and/or otherwise transmit information. In some implementations, an event recorder may include one or more physical processors, electronic storage, and/or other components. In some implementations, an event recorder may detect vehicle events based on a comparison of the information conveyed by the output signals from one or more sensors to predetermined (variable and/or fixed) values, threshold, functions, and/or other information. An event recorder may identify vehicle events and/or other information related to the operation of a vehicle in real-time or near real-time during operation of a vehicle. In some implementations, an event recorder may identify vehicle events and/or other information related to the operation of a vehicle based on previously stored information. For example, the previously stored information may be based on output signals generated days, weeks, months or more ago.

As used herein, the term "vehicle event" may refer to forward motion, motion in reverse, making a turn, speeding, unsafe driving speed, collisions, near-collisions, driving in a parking lot or garage, being stalled at a traffic light, loading and/or unloading of a vehicle, transferring gasoline to or from the vehicle, and/or other vehicle events in addition to driving maneuvers such as swerving, a U-turn, freewheeling, over-revving, lane-departure, short following distance, imminent collision, unsafe turning that approaches rollover and/or vehicle stability limits, hard braking, rapid acceleration, idling, driving outside a geo-fence boundary, crossing double-yellow lines, passing on single-lane roads, a certain number of lane changes within a certain amount of time or distance, fast lane change, cutting off other vehicles during lane-change speeding, running a red light, running a stop sign, parking a vehicle, performing fuel-inefficient maneuvers, and/or other driving maneuvers or combinations thereof.

Some types of vehicle events may be based on the actions or motion of the vehicle itself. Some types of vehicle events may be based on the actions or motion of nearby vehicles. Other types of vehicle events may be based on the actions taken or performed by a vehicle operator. Some types of vehicle events may be based on the actions taken or performed by vehicle operators of nearby vehicles. Some types of vehicle events may be based on a combination of the actions or motion of the vehicle itself, nearby vehicles, and/or the actions taken or performed by a particular vehicle operator or nearby vehicle operator. For example, a particular vehicle event may include hard braking followed (within a predetermined window of time) by a sharp turn and/or swerve. This particular vehicle event may indicate a near-collision that was severe enough that the vehicle operator decided that merely braking hard would not be sufficient to avoid the collision. Another example of a vehicle event that includes a combination of actions may be a lane change followed (within a predetermined window of time) by hard braking, which may indicate a poor decision to initiate the lane change. Another example of a vehicle event that includes a combination of actions may be a lane change followed (within a predetermined window of time) by a maneuver performed by a nearby vehicle (e.g., hard braking or swerving), which may indicate a nearby vehicle operator was at least surprised by the lane change.

The one or more processors of the computing server and/or of individual sets of resources may be configured to execute one or more computer program components. The computer program components may include one or more of a presentation component, an interface component, a distribution component, a report component, a scenario component, a performance component, a parameter determination component, an event detection component, a storage component, a link component, a simulation component, and/or other components.

The presentation component may be configured to facilitate presentation of interfaces, reports, detected vehicle events, information regarding physical surroundings of vehicles, and/or results to users, third parties, and/or vehicle operators. In some implementations, the presentation component may facilitate presentation, e.g., of an interface, to one or more users and/or vehicle operators. In some implementations, the presentation component may facilitate presentation, e.g., of one or more reports, results, and/or interfaces, to a third party.

The interface component may be configured to facilitate interaction with users. For example, the interface component may facilitate interaction through interfaces. For example, the interface component may receive input through an interface. In some implementations, the interface component may receive input from a user of the computing server. In some implementations, the interface component may receive input from vehicle operators. In some implementations, the interface component may receive input from a third party.

The distribution component may be configured to transmit information to and/or from the computing server, from and/or to all or part of a fleet of vehicles. In some implementations, the distribution component may be configured to transmit information from the computing server to all or part of the transceivers that are included in and/or carried by a fleet of vehicles. In some implementations, the distribution component may be configured to transmit information to the computing server from all or part of the transceivers that are included in and/or carried by a fleet of vehicles. In some implementations, transmission may be wireless. In some implementations, transmission may be point-to-point. In some implementations, transmission may be broadcast. In some implementations, transmission may be bi-directional. In some implementations, the presentation component, interface component, and/or one or more other components of the system may be configured to determine and/or present one or both of warnings and/or recommendations to a vehicle operator.

The parameter determination component may be configured to derive, determine, and/or otherwise generate physical surroundings in which individual vehicles are operating, current operating conditions of individual vehicles, vehicle parameters of individual vehicles, and/or other parameters. Operation of the parameter determination component may be based on the information conveyed by output signals from sensors and/or other information.

Physical surroundings of an individual vehicle may include static parameters (e.g., related to objects that are static), dynamic parameters (e.g., related to objects that are dynamic), and/or other parameters. For example, static parameters may include parameters related to roadside objects, roadside infrastructure (bridges, cross streets, signage, railroad crossings, etc.), and/or other parameters. For example, the dynamic parameters may include speed parameters of the individual vehicle, speed parameters of other vehicles, distance parameters, positional parameters, roadway parameters (e.g., related to the local surface of the road), and/or other parameters.

The one or more current operating conditions may be related to the vehicle, the operation of the vehicle, physical characteristics of the vehicle, and/or other information. In some implementations, the parameter determination component may be configured to determine one or more of the current operating conditions one or more times in an ongoing manner during operation of the vehicle. In some implementations, the parameter determination component may be configured to determine one or more of the parameters one or more times in an ongoing manner during operation of the vehicle.

The event detection component may be configured to detect vehicle events. In some implementations, vehicle events may be based on current operating conditions of a vehicle. In some implementations, vehicle events may be associated with the physical surroundings of a vehicle. In some implementations, vehicle events may be based on the operator of a vehicle. By way of non-limiting example, a vehicle event may be any event of interest to a vehicle operator, a fleet owner or operator, and/or an entity interested in the vehicle, its route, or its contents/cargo.

The scenario component may be configured to obtain and/or control access to vehicle event scenarios that correspond to vehicle events. Access control may include permission to read, write, and/or modify information, e.g., a stored set of vehicle event scenarios. In some implementations, the scenario component may be configured to create vehicle event scenarios. For example, the scenario component may be configured to create vehicle event scenarios that are based on (detected) vehicle events. Individual vehicle event scenarios may correspond to individual vehicle events. The individual vehicle events may be associated with physical surroundings of one or more individual vehicles. For example, an individual vehicle event may be associated with a set of physical surroundings of the individual vehicle around the time of an individual vehicle event.

The individual vehicle event scenarios may be associated with circumstances. For example, an individual vehicle event scenario may be associated with a set of circumstances that is based on a set of physical surroundings, i.e., the set of physical surroundings of the individual vehicle around the time of the corresponding individual vehicle event. For example, a vehicle event scenario may have a scenario time period that begins prior to an occurrence of a potential vehicle event. For example, a particular vehicle event scenario may correspond to and/or be based on a real-life vehicle event of a vehicle accident. The corresponding vehicle event scenario may present the same or a similar driving situation that preceded the vehicle accident. However, if a vehicle operator would act differently when presented with the particular vehicle event scenario, a vehicle event (e.g., an accident) may be prevented and/or preventable. Accordingly, a vehicle event scenario may correspond to a potential vehicle event.

The individual vehicle event scenarios may include individual geographical locations. In some implementations, the scenario component may be configured to add one or more vehicle event scenarios to the set of vehicle event scenarios. In some implementations, the scenario component may be configured to remove one or more vehicle event scenarios from the set of vehicle event scenarios. In some implementations, a set of vehicle event scenarios may include vehicle event scenarios based on real-life vehicle events that have been detected at some time. In some implementations, a set of vehicle event scenarios may include vehicle event scenarios that are not based on real-life vehicle events, but rather created artificially, e.g., by human programming.

The link component may be configured to establish links between vehicle operators and one or more simulation engines. In some implementations, a vehicle operator may be a human vehicle operator. Alternatively, and/or simultaneously, in some implementations, a vehicle operator may be an autonomous driving algorithm. In some implementations, actions by a particular vehicle operator may combine human actions and autonomous actions. In some implementations, a link between a vehicle operator and a simulation engine may include a communication link. In some implementations, a communication link may provide a vehicle operator with control over operations of a simulated vehicle.

The simulation component may be configured to create simulation scenarios that are suitable for use by simulation engines. Individual simulation scenarios may correspond to individual vehicle event scenarios. Individual simulation scenarios may mimic and/or be based on the circumstances associated with corresponding individual vehicle event scenarios. For example, an individual simulation scenario may mimic and/or be based on a set of circumstances associated with an individual vehicle event scenario. In some implementations, the simulated vehicle may be based on the individual vehicle of the individual vehicle event that corresponds to the individual vehicle event scenario.

The performance component may be configured to determine one or more metrics that quantify a performance of a vehicle operator in running one or more simulation scenarios. In some implementations, a metric may be reduced responsive to an individual one of the set of simulation scenarios resulting in a preventable accident. In some implementations, a metric may represent a ratio of a first set of simulation scenarios and a second set of simulation scenarios. For example, the first set may have resulted in preventable accidents and the second set may have completed without preventable accidents. In some implementations, individual scenarios may be rated for difficulty. For example, a metric may represent a score that reflects the difficulty of the scenario. For example, causing an accident during a simple (e.g., a low rated) scenario may affect the metric in a worse manner than causing an accident during a difficult (e.g., high rated) scenario. In some implementations, the performance component may be configured to compare one or more determined metrics for different vehicle operators. In some implementations, the performance component may be configured to determine which vehicle operator performed better out of a set of vehicle operators, and such a determination may be based on comparison of one or more metrics.

The storage component may be configured to store information in electronic storage. For example, the information may be stored in the electronic storage of a particular vehicle. In some implementations, the stored information may be related to detected vehicle events, determined vehicle parameters, executable code, and/or other information. In some implementations, the storage component may be configured to store vehicle event records of detected vehicle events in electronic storage.

The report component may be configured to generate reports associated with one or more of generated output signals, detected vehicle events, information regarding physical surroundings of vehicles, responses to queries, results from executable code, results from simulations, results from comparisons between different vehicle operators, and/or other information. In some implementations, the report component may be configured to publish reports, e.g. by posting online or through other mechanisms that effectuate publication. In some implementations, the report component may be configured to transfer reports to users, third parties, and/or other entities interested in one or more of the vehicles, the vehicle operators, the vehicle routes, or other information. Reports may include information captured by image sensors during detected vehicle events. In some implementations, reports may include information that is derived from and/or based on information captured by image sensors during detected vehicle events.

In some implementations, one or more components of the system may be configured to obtain, receive, and/or determine contextual information related to environmental conditions near and/or around vehicles. Environmental conditions may be related to weather conditions, traffic conditions, visibility, and/or other environmental conditions. In some implementations, one or more environmental conditions may be received from one or more sources external to the vehicle. For example, a source external to the vehicle may include an external provider.

In some implementations, detection of vehicle events may further be based one or more types of contextual information. In some implementations, detection may be accomplished and/or performed at the vehicle.

As used herein, any association (or relation, or reflection, or indication, or correspondency) involving vehicles, sensors, vehicle events, operating conditions, parameters, thresholds, functions, notifications, scenarios, location-specific features, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other objects, features, and characteristics of the servers, systems, and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this disclosure, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
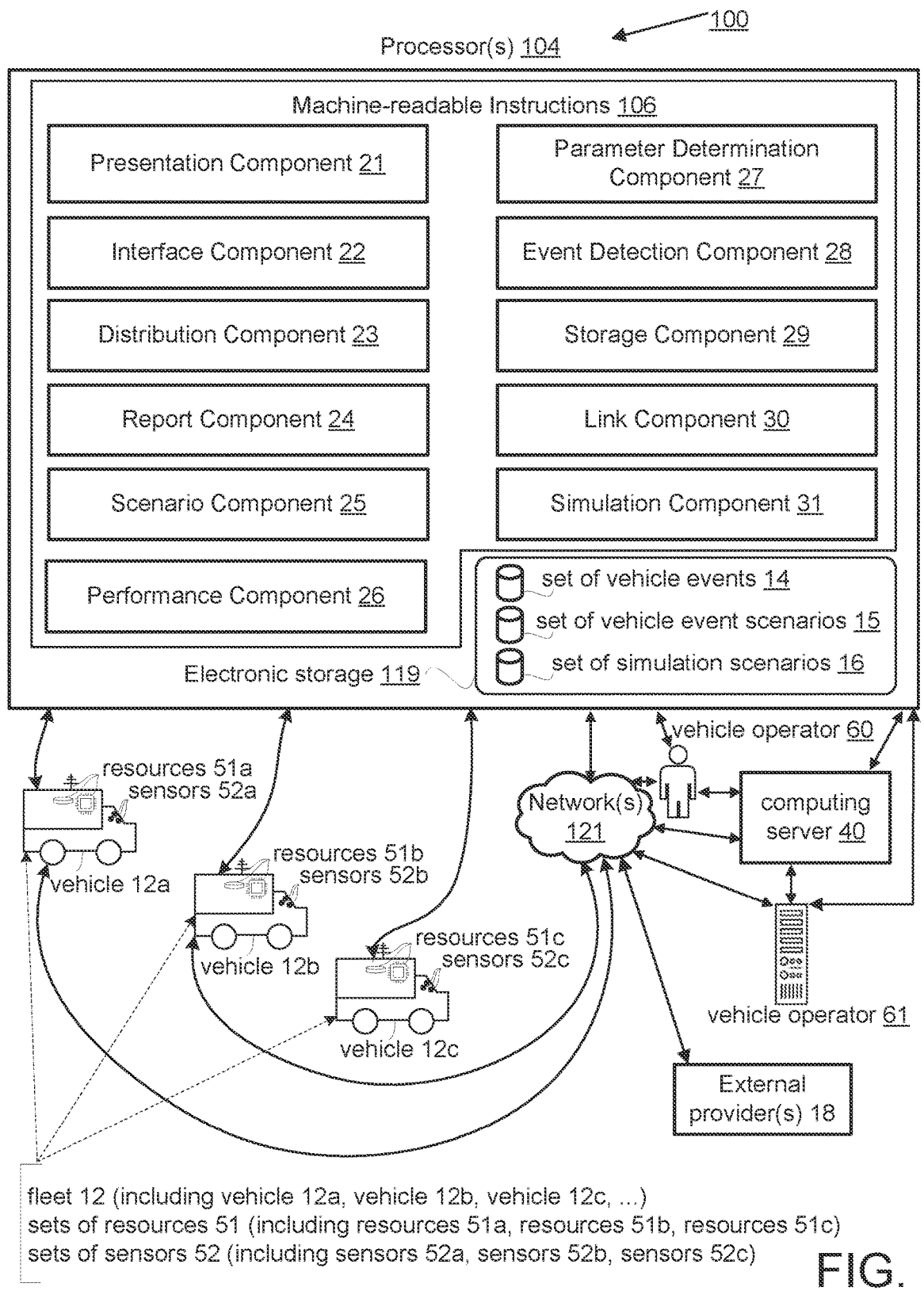
FIG. 1 illustrates a system configured to generate data describing physical surroundings of vehicles during operation, in accordance with one or more embodiments.

FIG. 1 illustrates a system 100 configured to determine driving performance by a vehicle operator for simulated driving of a simulated vehicle in a simulation engine. Simulations may be based on real-life driving situations, such as detected vehicle events, on hypothetical driving situations, and/or on other driving situations, as well as combinations thereof. Vehicle events may be detected by individual vehicles. The vehicles may form a fleet 12 of vehicles. Fleet 12 may include a first vehicle 12a, a second vehicle 12b, a third vehicle 12c, and so forth. As used here, the term fleet may refer to a set of at least 5 vehicles, at least 10 vehicles, at least 100 vehicles, at least 1000 vehicles, and/or another number of vehicles. The number of vehicles depicted in FIG. 1 is not intended to be limiting.

Individual vehicles may include a set of resources for data processing and/or electronic storage, including but not limited to persistent storage. Individual vehicles may include a set of sensors configured to generate output signals conveying information related to the operation of the individual vehicles. System 100 may include one or more of sets of resources 51, sets of sensors 52, a computing server 40, electronic storage 119, and/or other components. In some implementations, system 100 may be a distributed data center, include a distributed data center, or act as a distributed data center.

One or more components of system 100 may include one or more processors 104 and/or other mechanisms/components for processing information. For example, a set of resources included in and/or carried by an individual vehicle may include one or more processors. For example, computing server 40 may include one or more processors. In some implementations, other vehicle-specific components, such as, by way of non-limiting example, a vehicle event recorder, may include one or more processors. In some implementations, some or all of the processors may be configured via machine-readable instructions to perform various functions. One or more components of system 100 may include electronic storage 119 and/or other mechanisms/components for storing information. For example, a set of resources included in and/or carried by an individual vehicle may include (local) electronic storage. For example, computing server 40 may include electronic storage. In some implementations, other vehicle-specific components, such as, by way of non-limiting example, a vehicle event recorder, may include electronic storage.

By way of non-limiting example, sets of resources 51 (e.g. set of resources 51c carried by vehicle 12c) may include electronic storage, a processor, a transceiver, an event recorder, and/or other vehicle-specific components. First vehicle 12a may carry a first set of resources 51a. Second vehicle 12b may carry a second set of resources 51b. Third vehicle 12c may carry a third set of resources 51c, and so forth. Each set of resources may include instances of electronic storage, a processor, a transceiver, an event recorder, and/or other vehicle-specific components. First set of resources 51a may include a first transceiver. Second set of resources 51b may include a second transceiver, and so forth. For example, first set of resources 51a may include first electronic storage, second set of resources 51b may include second electronic storage, third set of resources 51c may include third electronic storage, and so forth. For example, first set of resources 51a may include one or more processors, second set of resources 51b may include one or more processors, third set of resources 51c may include one or more processors, and so forth.

Transceivers may be configured to transfer and/or receive information to and/or from other elements of system 100, including but not limited to other vehicles (or components carried by other vehicles in fleet 12), computing server 40, a vehicle operator 61, and/or other components. In some implementations, transceivers may be configured to transfer and/or receive information wirelessly, and/or otherwise provide information-distribution resources. For example, a transceiver may be configured to receive executable code, such as code that includes and/or represents a definition of a particular vehicle event, a particular maneuver of a vehicle, a particular condition of a vehicle operator of a vehicle, and/or other information. For example, a transceiver may be configured to transmit results from executable code, responses to queries, information regarding detected vehicle events, information regarding physical surroundings, and/or other information, e.g., to a computing server. In some implementations, transceivers may be configured to obtain, receive, measure, and/or otherwise determine one or more conditions related to data transmissions.

For example, one or more current local data transmission conditions may include a current bandwidth (e.g., in MB/s), a current transmission protocol (e.g., LTE™, 3G, 4G, 5G, Wi-Fi™, etc.), a current transmission cost (e.g., in $/MB), and/or other conditions.

Referring to FIG. 1, a set of sensors 52 may be configured to generate output signals conveying information. In some implementations, the generated information may be related to the operation of one or more vehicles in fleet 12. In some implementations, the generated information may be related to the physical surroundings of one or more vehicles in fleet 12. An individual set of sensors 52 may be carried by an individual vehicle. First vehicle 12a may carry a first set of sensors 52a. Second vehicle 12b may carry a second set of sensors 52b. Third vehicle 12c may carry a third set of sensors 52c, and so forth. The generated information may include timing information, location information, operator information, and/or other information. In some implementations, generated information may be associated with timing information (e.g., from a timer), location information, operator information, and/or other information.

In some implementations, timing information may associate and/or otherwise relate the generated output signals with one or more moments of generation by one or more particular sensors. For example, timing information may include time stamps that indicate moments of generation. For example, at a time labeled $t_1$ the speed of a vehicle may be 50 mph, at a time labeled $t_2$ the speed may be 55 mph, and so forth. A set of time stamps or moments in time may form a timeline. In some implementations, location information may associate and/or otherwise relate the generated output signals with one or more locations of generation (or, locations at the moment of generation) by one or more particular sensors. In some implementations, the operator information may associate and/or otherwise relate the generated output signals with individual vehicle operators at the moments of generation. For example, a particular sensor may generate a particular output signal conveying a particular operating parameter of an individual vehicle, such as speed and/or another operating parameter. The particular output signal may include and/or be associated with a timestamp (e.g., time=$t_x$) that indicates when the particular output signal was generated. For example, a series of output signals may be associated with a corresponding series of timestamps. In some implementations, the particular output signal may be associated with a particular vehicle operator. For example, the particular output signal may be associated with the particular vehicle operator that was operating the individual vehicle at the time the particular output signal was generated. In some implementations, a set of resources 51 may be configured to store generated information, timing information, location information, operator information, and/or other information, e.g. in electronic storage. In some implementations, information may be stored after compression, filtering, and/or other processing to reduce the required amount of storage space.

A sensor may be configured to generate output signals conveying information related to the operation of a vehicle. Information related to the operation of a vehicle may include feedback information from one or more of the mechanical systems of the vehicle, and/or other information. In some implementations, at least one of the sensors may be a vehicle system sensor included in an engine control module (ECM) system or an electronic control module (ECM) system of the vehicle. The sensors of a particular vehicle may be referred to as a set of sensors.

Information related to current operating conditions of a vehicle may include feedback information from one or more of the mechanical systems of the vehicle, the electrical systems of the vehicle, and/or other information. The mechanical systems of a vehicle may include, for example, the engine, the drive train, the lighting systems (e.g., headlights, brake lights), the braking system, the transmission, fuel delivery systems, and/or other mechanical systems. The mechanical systems of a vehicle may include one or more mechanical sensors, electronic sensors, and/or other sensors that generate the output signals (e.g., seat belt sensors, tire pressure sensors, etc.). In some implementations, at least one of the sensors carried by a vehicle may be a vehicle system sensor included in an ECM system of the vehicle.

In some implementations, information related to current operating conditions of a vehicle may include information related to the environment in and/or around the vehicle. The vehicle environment may include spaces in and around an interior and an exterior of the vehicle. The information may include information related to movement of the vehicle, an orientation of the vehicle, a geographic position of the vehicle, a spatial position of the vehicle relative to other objects, a tilt angle of the vehicle, an inclination/declination angle of the vehicle, and/or other information. In some implementations, the output signals conveying information may be generated via non-standard aftermarket sensors installed in the vehicle. Non-standard aftermarket sensors may include, for example, a video camera, a microphone, an accelerometer, a gyroscope, a geolocation sensor (e.g., a GPS device), a radar detector, a magnetometer, radar (e.g. for measuring distance of leading vehicle), and/or other sensors. In some implementations, the set of sensors carried by a vehicle may include multiple cameras positioned around the vehicle and synchronized together to provide a 360-degree view of the interior of the vehicle (e.g., the cabin) and/or a 360-degree view of the exterior of the vehicle.

Although individual sets of sensors 52a, 52b, and 52c are depicted in FIG. 1 as having three elements, this is not intended to be limiting. For individual vehicles, a set of sensors may include one or more sensors located adjacent to and/or in communication with the various mechanical systems of the vehicle, in one or more positions (e.g., at or near the front of the vehicle, at or near the back of the vehicle, on the side of the vehicle, on or near the windshield of the vehicle, facing outward and/or inward, etc.) to accurately acquire information representing the vehicle environment (e.g. visual information, spatial information, orientation information), and/or in other locations. For example, in some implementations, a set of sensors for a particular vehicle may be configured such that a first sensor is located near or in communication with a rotating tire of the vehicle, and a second sensor located on top of the vehicle is in communication with a geolocation satellite.

Individual sensors may be configured to generate output signals conveying information. The information may include visual information, motion-related information, position-related information, biometric information, heat-related information, infra-red information, and/or other information. In some implementations, one or more components of system 100 may determine one or more parameters that are measured, derived, estimated, approximated, and/or otherwise determined based on one or more output signals generated by one or more sensors.

Output signals generated by individual sensors (and/or information based thereon) may be stored and/or transferred in electronic files. In some implementations, output signals generated by individual sensors (and/or information based thereon) may be streamed to one or more other components of system 100.

Individual sensors may include image sensors, cameras, and/or other sensors. Individual sensors may be configured to capture information, including but not limited to visual information, video information, audio information, heat information, geolocation information, orientation and/or motion information, depth information, and/or other information. Information captured by one or more sensors may be marked, timestamped, annotated, and/or otherwise processed such that information captured by other sensors can be synchronized, aligned, annotated, and/or otherwise associated therewith. For example, video information captured by an image sensor may be synchronized with information captured by an accelerometer, GPS unit, or other sensor. Output signals generated by individual image sensors (and/or information based thereon) may be stored and/or transferred in electronic files.

System 100 may be coupled to individual vehicles. For example, system 100 may be communicatively coupled to individual vehicles and/or to components carried by individual vehicles, including but not limited to transceivers. For example, components of system 100 may be configured to communicate through one or more networks 121. The one or more networks 121 may, by way of non-limiting example, include the internet.

Computing server 40 may include one or more processors 104. Computing server 40 may be remote, separate, and/or discrete from the fleet of vehicles 12. Remote computer server 40 may be physically unconnected to any vehicle in the fleet. One or more processors 104 may be configured via machine-readable instructions 106 to perform various functions. Computing server 40 may be configured to facilitate presentation of an interface to a vehicle operator 60 of computing server 40 and/or vehicle operator 61. The interface may be configured to facilitate interaction between one or more users, vehicle operators, and/or computing server 40. For example, the interface may be configured to receive input from vehicle operator 60 and/or (third party and/or autonomous) vehicle operator 61. Computing server 40 may be further configured to transmit information (e.g., executable code, and/or a query) to some vehicles in the fleet or to all vehicles of the fleet. Results and/or other responses from individual vehicles may be received, aggregated, and/or presented by computing server 40.

In some implementations, a set of resources included in and/or carried by an individual vehicle may include an event recorder (also referred to as vehicle event recorder). For example, set of resources 51c carried by the vehicles may include an event recorder. An event recorder may be configured to generate, detect, identify, capture, and/or record information related to the operation of a vehicle. Information related to a vehicle may include, by way of non-limiting example, information related to and/or based on vehicle events. An event recorder may be configured to off-load and/or otherwise transmit information (e.g. through use of a transceiver). In some implementations, an event recorder may include one or more physical processors, electronic storage, and/or other components. In some implementations, an event recorder may detect vehicle events based on a comparison of the information conveyed by the output signals from one or more sensors to predetermined (variable and/or fixed) values, threshold, functions, and/or other information. In some implementations, detections by the event recorder may be based, at least in part, on information included in executable code and/or other information received from a third party. An event recorder may identify vehicle events in real-time or near real-time during operation of a vehicle.

Referring to FIG. 1, one or more processors 104 of computing server 40 and/or of individual sets of resources 51 may be configured to execute one or more computer program components. The computer program components may include one or more of a presentation component 21, an interface component 22, a distribution component 23, a report component 24, a scenario component 25, a performance component 26, a parameter determination component 27, an event detection component 28, a storage component 29, a link component 30, a simulation component 31, and/or other components.

Presentation component 21 may be configured to facilitate presentation of interfaces, reports, detected vehicle events, information regarding physical surroundings of vehicles, and/or results to users, third parties, and/or vehicle operators. In some implementations, presentation component 21 may facilitate presentation, e.g., of an interface, to one or more users and/or vehicle operators, including but not limited to vehicle operator 60 and/or vehicle operator 61. In some implementations, presentation component 21 may facilitate presentation, e.g., of one or more reports, results, and/or interfaces, to a third party. This enables information to be communicated between a vehicle operator and/or other components of system 100. As an example, a warning regarding a dangerous driving maneuver and/or vehicle event may be displayed to the driver of the vehicle via such an interface, e.g. as a notification. Presentation component 21 enables information to be communicated between a third party and/or other components of system 100.

Examples of interface devices suitable for inclusion in an interface include a keypad, buttons, switches, a keyboard, knobs, levers, a display screen, a touch screen, speakers, a microphone, an indicator light, an audible alarm, a printer, a tactile feedback device, and/or other interface devices. It is to be understood that other communication techniques, either hard-wired or wireless, are also contemplated by the present disclosure as an interface.

Other exemplary input devices and techniques adapted for use by users and/or vehicle operators include, but are not limited to, an RS-232 port, RF link, an IR link, modem (telephone, cable, and/or other modems), a cellular network, a Wi-Fi™ network, a local area network, and/or other devices and/or systems. In short, any technique for communicating information is contemplated by the present disclosure as an interface.

Interface component 22 may be configured to facilitate interaction with users and/or vehicle operators. For example, a user may be a fleet manager, or someone investigating fleet operations. Interface component 22 may facilitate interaction through interfaces. For example, interface component 22 may receive input through an interface. In some implementations, interface component 22 may receive input from vehicle operator 60. In some implementations, the received input may represent a distributed query, executable code, and/or other information. For example, an entire fleet of vehicles 12 (or any subset thereof) may be queried for particular information. In some implementations, a distributed query or other request may be associated with one or more response constraints. For example, distribution component 23 may be configured to transmit the one or more response constraints to all or part of fleet of vehicles 12.

In some implementations, interface component 22 may be configured to effectuate a review presentation to a user or reviewer. A review presentation may be based on information related to one or more detected vehicle events. In some implementations, a review presentation may provide a prompt to a user or reviewer to provide manual review input, e.g., regarding one or more detected vehicle events. For example, a reviewer may be prompted via a question, an inquiry, and/or via other types of prompts. For example, a reviewer may be asked whether a driver was wearing a seatbelt at a particular point in time, or whether one or more lanes appear to be closed, or whether the driver is a nearby vehicle had his eyes on the road. A review presentation may be implemented as an interface to facilitate interaction for a reviewer. For example, such an interface may receive review input from a reviewer, including but not limited to manual review input. In some implementations, review input may be responsive to a prompt. In some implementations, a vehicle operator may receive information based on review input. Such information may be referred to as feedback. For example, an interface for a vehicle operator (this may be referred to as a driver interface) may present a message to a vehicle operator to "remember to wear your seatbelt," responsive to particular review input received from a reviewer (through a different interface). In some implementations, a driver interface may be configured to detect a vehicle operator's response and/or reaction to specific feedback. In some implementations, the response and/or reaction by a vehicle operator may be specific to the feedback received through the driver interface. In some implementations, review input may be used to update and/or change a vehicle event report.

Distribution component 23 may be configured to transmit information to and/or from computing server 40 from and/or to all or part of fleet of vehicles 12. In some implementations, distribution component 23 may be configured to transmit information from computing server 40 to all or part of the transceivers that are included in and/or carried by fleet of vehicles 12. In some implementations, distribution component 23 may be configured to transmit information to computing server 40 from all or part of the transceivers that are included in and/or carried by fleet of vehicles 12. In some implementations, transmission may be wireless. In some implementations, transmission may be point-to-point. In some implementations, transmission may be broadcast. In some implementations, transmission may be bi-directional.

In some implementations, distribution component 23 may be configured to transmit executable code from computing server 40 to individual vehicles in a fleet, e.g., based on the current locations of the individual vehicles. For example, distribution component 23 may be configured to transmit results of a query to computing server 40 from some or all of the vehicles in fleet 12. In some implementations, presentation component 21, interface component 22, and/or one or more other components of system 100 may be configured to determine and/or present one or both of warnings and/or recommendations to a vehicle operator, wherein the warnings and/or recommendations are determined based on detected vehicle events and/or other information.

Parameter determination component 27 may be configured to derive, determine, and/or otherwise generate physical surroundings in which individual vehicles are operating, current operating conditions of individual vehicles, vehicle parameters of individual vehicles, and/or other parameters. Operation of parameter determination component 27 may be based on the information conveyed by the output signals from the sensors and/or other information. Operation of parameter determination component 27 may occur over time, in an ongoing manner, intermittently, and/or otherwise spanning a period of time. The period of time may range from seconds, to minutes, hours, days, weeks, months, or years.

Physical surroundings of an individual vehicle may include static parameters (e.g., related to objects that are static), dynamic parameters (e.g., related to objects that are dynamic), and/or other parameters. For example, static parameters may include parameters related to roadside objects, roadside infrastructure (bridges, cross streets, signage, railroad crossings, potholes, etc.), and/or other parameters. For example, the dynamic parameters may include speed parameters of the individual vehicle, speed parameters of other vehicles, distance parameters, positional parameters, roadway parameters (e.g., related to the local surface of the road, such as the type of road surface, water/ice/snow on the road, slickness of the road, potholes in the road, etc.), and/or other parameters.

Figure 2:
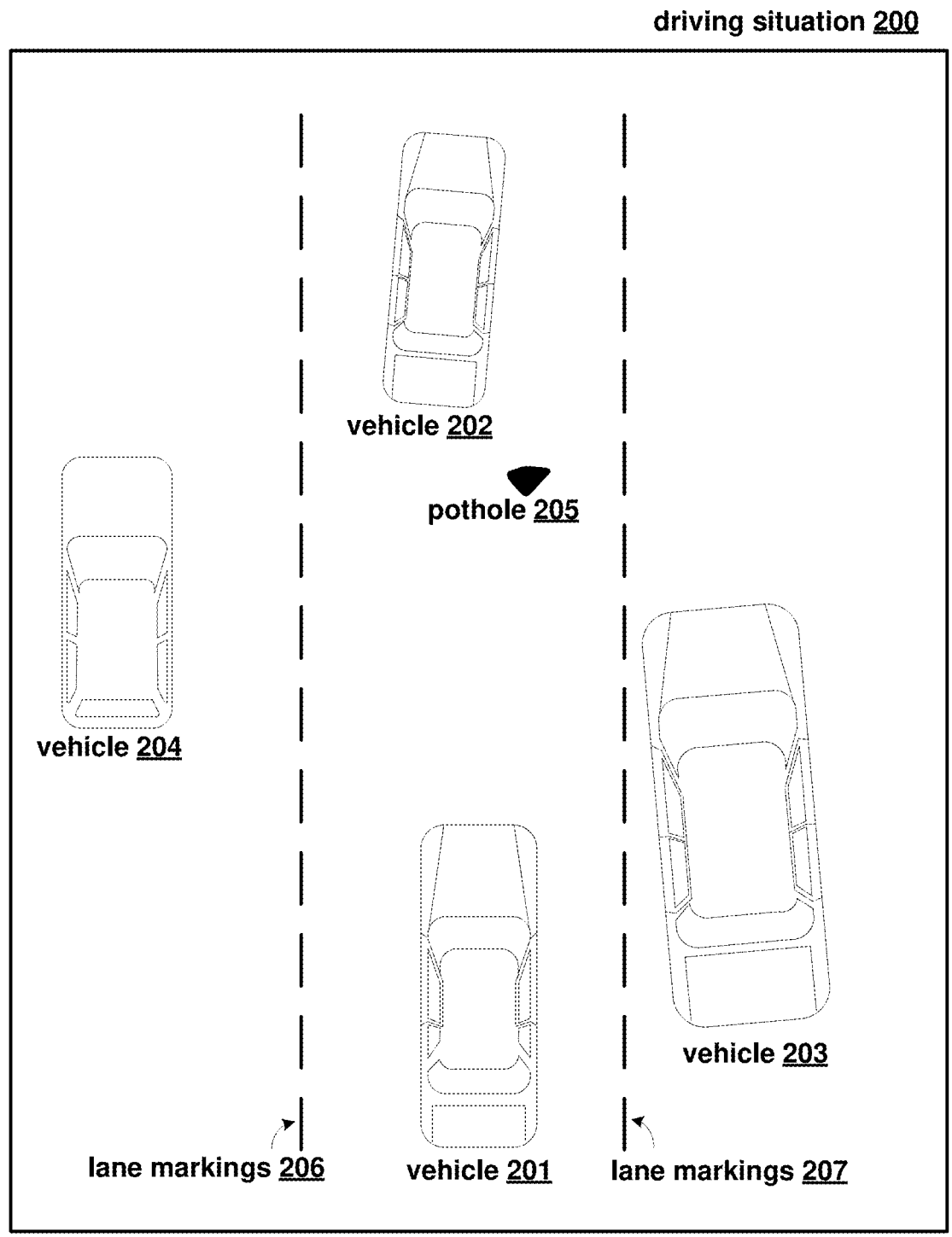
FIG. 2 illustrates an exemplary driving situation that can be used by a system configured to determine driving performance by a vehicle operator for simulated driving of a simulated vehicle in a simulation engine, in accordance with one or more embodiments.

By way of non-limiting example, FIG. 2 illustrates an exemplary driving situation 200, shown in a top view, in which a vehicle 201 is equipped with a system that includes a parameter determination component similar to parameter determination component 27 which may be used to determine parameters describing physical surroundings of vehicle 201 and/or parameters describing current operating conditions of vehicle 201 during real-world operation. In the same lane as vehicle 201 is a vehicle 202. In the lane to the right is a vehicle 203, and in the lane to the left is a vehicle 204. Assume all vehicles are heading in a generally similar direction (e.g., northbound). The lanes are marked by lane markings 206 and lane markings 207. The center lane includes a static object, pothole 205. Driving situation 200 may represent a snapshot of a real-world sequence or timeline in which each vehicle travels independently. Immediately following this snapshot, one or more vehicle events may have occurred in the real world. As a first example, vehicle 201 may have braked sufficiently hard to exceed a deceleration threshold, perhaps due to vehicle 202 braking suddenly. As a second example, vehicle 201 may have swerved to avoid a collision with vehicle 203 as vehicle 203 crossed lane markings 207. As a third example, vehicle 201 may have swerved across lane markings 206 and rear-ended vehicle 204. A parameter determination component similar to parameter determination component 27 may be used to determine, e.g., the speed of vehicle 201, and the relative speeds of vehicle 202, vehicle 203, and vehicle 204. Additionally, distances between the vehicles may be determined. In some implementations, other vehicle characteristics, such as size, make, model, color, license plate, characteristics of the vehicle operator, number of passengers, and apparent damage may be determined by one or more components of system 100.

For example, the physical surroundings of a particular vehicle in operation, such as vehicle 201, may include one or more of a first distance to the vehicle in front of the particular vehicle, a second distance to the vehicle behind the particular vehicle, a third distance to the nearest vehicle in the adjacent lane to the right, a fourth distance to the nearest vehicle in the adjacent lane to the left, a fifth distance to a pothole in front of the vehicle, a sixth distance to lane markings near the right side of the particular vehicle, a seventh distance to lane markings near the left side of the particular vehicle, an eight distance between the nearest two vehicles in the adjacent lane to the right, a ninth distance between the nearest two vehicles in the adjacent lane to the left, a tenth distance between the nearest vehicle in the adjacent lane to the right and the lane markings between that vehicle and the particular vehicle, an eleventh distance between the nearest vehicle in the adjacent lane to the left and the lane markings between that vehicle and the particular vehicle, and/or other distances. These distances may be determined and/or derived in an ongoing manner, such that a timeline for each individually may be created and/or recreated, as well as for the combination of some or all of them.

For example, the physical surroundings of a particular vehicle in operation, such as vehicle 201, may include one or more of a first speed (relative and/or absolute) of the vehicle in front of the particular vehicle, a second speed (relative and/or absolute) to the vehicle behind the particular vehicle, a third speed (relative and/or absolute) to the nearest vehicle in the adjacent lane to the right, a fourth speed (relative and/or absolute) to the nearest vehicle in the adjacent lane to the left, and/or other speed parameters. For example, the physical surroundings of the particular vehicle in operation may include one or more of a first heading (relative and/or absolute) of the vehicle in front of the particular vehicle, a second heading (relative and/or absolute) to the vehicle behind the particular vehicle, a third heading (relative and/or absolute) to the nearest vehicle in the adjacent lane to the right, a fourth heading (relative and/or absolute) to the nearest vehicle in the adjacent lane to the left, and/or other heading parameters. For example, the physical surroundings of the particular vehicle in operation may include one or more of a first acceleration (relative and/or absolute) of the vehicle in front of the particular vehicle, a second acceleration (relative and/or absolute) to the vehicle behind the particular vehicle, a third acceleration (relative and/or absolute) to the nearest vehicle in the adjacent lane to the right, a fourth acceleration (relative and/or absolute) to the nearest vehicle in the adjacent lane to the left, and/or other acceleration parameters. These speeds, headings and/or accelerations may be determined and/or derived in an ongoing manner, such that a timeline for each individually may be created and/or recreated, as well as for the combination of some or all of them.

In some implementations, information representing the physical surroundings may be determined in post-processing, e.g. at computing server 40. For example, using computer vision techniques, previously captured visual information of a particular vehicle event that occurred in the past may be analyzed (e.g., frame by frame) to approximate one or more parameters that are part of the physical surroundings of that particular vehicle event.

Referring to FIG. 1, the one or more current operating conditions may be related to the vehicle, the operation of the vehicle, physical characteristics of the vehicle, and/or other information. In some implementations, parameter determination component 27 may be configured to derive, determine, and/or otherwise generate one or more of the current operating conditions one or more times in an ongoing manner during operation of the vehicle.

In some implementations, operating conditions may include vehicle parameters. For example, vehicle parameters may be related to one or more of an acceleration, a direction of travel, a turn diameter, a vehicle speed, an engine speed (e.g. RPM), a duration of time, a closing distance, a lane departure from an intended travelling lane of the vehicle, a following distance, physical characteristics of the vehicle (such as mass and/or number of axles, for example), a tilt angle of the vehicle, an inclination/declination angle of the vehicle, and/or other parameters.

The physical characteristics of a vehicle may be physical features of a vehicle set during manufacture of the vehicle, during loading of the vehicle, and/or at other times. For example, the one or more vehicle parameters may include a vehicle type (e.g., a car, a bus, a semi-truck, a tanker truck), a vehicle size (e.g., length), a vehicle weight (e.g., including cargo and/or without cargo), a number of gears, a number of axles, a type of load carried by the vehicle (e.g., food items, livestock, construction materials, hazardous materials, an oversized load, a liquid), vehicle trailer type, trailer length, trailer weight, trailer height, a number of axles, and/or other physical characteristics and/or features.

In some implementations, parameter determination component 27 may be configured to derive, determine, and/or otherwise generate one or more vehicle parameters based on the output signals from at least two different sensors. For example, parameter determination component 27 may derive, determine, and/or otherwise generate one or more of the vehicle parameters based on output signals from a sensor related to the ECM system and an external aftermarket added sensor. In some implementations, a determination of one or more of the vehicle parameters based on output signals from at least two different sensors may be more accurate and/or precise than a determination based on the output signals from only one sensor. For example, on an icy surface, output signals from an accelerometer may not convey that a driver of the vehicle is applying the brakes of the vehicle. However, a sensor in communication with the braking system of the vehicle would convey that the driver is applying the brakes. A value of a braking parameter may be determined based on the braking sensor information even though the output signals from the accelerometer may not convey that the driver is applying the brakes.

Parameter determination component 27 may be configured to derive, determine, and/or otherwise generate vehicle parameters that are not directly measurable by any of the available sensors. For example, an inclinometer may not be available to measure the road grade, but vehicle speed data as measured by a GPS system and/or by a wheel sensor ECM may be combined with accelerometer data to determine the road grade. If an accelerometer measures a force that is consistent with braking, but the vehicle speed remains constant, the parameter component can determine that the measured force is a component of the gravity vector that is acting along the longitudinal axis of the vehicle. By using trigonometry, the magnitude of the gravity vector component can be used to determine the road grade (e.g., pitch angle of the vehicle in respect to the horizontal plane).

In some implementations, one or more of the vehicle parameters may be determined one or more times in an ongoing manner during operation of the vehicle. In some implementations, one or more of the vehicle parameters may be determined at regular time intervals during operation of the vehicle. The timing of the vehicle parameter determinations (e.g., in an ongoing manner, at regular time intervals, etc.) may be programmed at manufacture, obtained responsive to user entry and/or selection of timing information via an interface and/or a (remote) computing device, and/or may be determined in other ways. The time intervals of parameter determination may be significantly less (e.g. more frequent) than the time intervals at which various sensor measurements are available. In such cases, parameter determination component 27 may estimate vehicle parameters in between the actual measurements of the same vehicle parameters by the respective sensors, to the extent that the vehicle parameters are measurable. This may be established by means of a physical model that describes the behavior of various vehicle parameters and their interdependency. For example, a vehicle speed parameter may be estimated at a rate of 20 times per second, although the underlying speed measurements are much less frequent (e.g., four times per second for ECM speed, one time per second for GPS speed). This may be accomplished by integrating vehicle acceleration, as measured by the accelerometer sensor where the measurements are available 1000 times per second, across time to determine change in speed that is accumulated over time again for the most recent vehicle speed measurement. The benefit of these more frequent estimates of vehicle parameters are many and they include improved operation of other components of system 100, reduced complexity of downstream logic and system design (e.g., all vehicle parameters are updated at the same interval, rather than being updating irregularly and at the interval of each respective sensor), and more pleasing (e.g., "smooth") presentation of vehicle event recorder data through an interface.

In some implementations, parameter determination component 27 may be configured to adjust how detailed the determination of the physical surroundings is, e.g. as controlled through user-controlled input. For example, a user may set or provide one or more response constraints that are related to the operation of parameter determination component 27 (and/or other components of system 100). For example, a first type of vehicle event may merely require a lower level of details for the determination of the physical surroundings, whereas a second type of vehicle event may merely require a higher level of details for the determination of the physical surroundings (which will require more memory to store and/or more bandwidth to transfer than for the first type of vehicle event).

Event detection component 28 may be configured to detect vehicle events. In some implementations, vehicle events may be based on current operating conditions of a vehicle. In some implementations, vehicle events may be associated with the physical surroundings of a vehicle. In some implementations, vehicle events may be based on the operator of a vehicle. For example, a vehicle event may be detected based on comparing one or more vehicle parameters with one or more thresholds. In some implementations, detections may be based on definitions and/or representations of vehicle events, actions and/or conditions of vehicle operators, and/or vehicle maneuvers that are included in executable code. For example, particular executable code from a third party may include a definition for the detection of an event that represents an inattentive vehicle operator. Such executable code may be distributed across a fleet of vehicles, and results from the detection of an occurrence of the event that represents an inattentive vehicle operator may be transferred to computing server 40, and may be presented to the third party.

For example, particular executable code may include a definition for the detection of an event that represents a fatigued vehicle operator. Such executable code may be distributed across a fleet of vehicles, and results from the detection of an occurrence of the event that represents a fatigued vehicle operator may be transferred to computing server 40, and subsequently presented. For example, a third party may test and/or compare different algorithms to detect a fatigued vehicle operator. In some implementations, system 100 may be configured to support A/B testing between different algorithms to detect similar events, e.g. to determine algorithm performance under controlled conditions. In some implementations, results from different algorithms (e.g., a default algorithm to detect a fatigued driver and an alternative algorithm to detect a fatigued driver) may be presented to one or more manual reviewers, e.g. for head-to-head comparisons of one or more results. In some implementations, presentation to reviewers (manual and/or otherwise) may be accomplished through interfaces. For example, a manual reviewer may be able to enter feedback into an interface as part of a review.

For example, particular executable code from a third party may include a definition for the detection of an event that represents a fuel-inefficient maneuver of a vehicle. Such executable code may be distributed across a fleet of vehicles, and results from the detection of an occurrence of the event that represents a fuel-inefficient maneuver may be transferred to computing server 40, and subsequently presented.

In some implementations, event detection component 28 may be configured to detect specific driving maneuvers based on one or more of a vehicle speed, an engine load, a throttle level, an accelerator position, vehicle direction, a gravitational force, and/or other parameters being sustained at or above threshold levels for pre-determined amounts of time. In some implementations, an acceleration and/or force threshold may be scaled based on a length of time an acceleration and/or force is maintained, and/or the particular speed the vehicle is travelling. Event detection component 28 may be configured such that force maintained over a period of time at a particular vehicle speed may decrease a threshold force the longer that the force is maintained. Event detection component 28 may be configured such that, combined with engine load data, throttle data may be used to determine a risky event, a fuel wasting event, and/or other events.

In some implementations, event detection component 28 may be configured to store detected vehicle events in electronic storage, e.g. as set of vehicle events 14. Event detection component 28 may be configured to control access to set of vehicle events 14. Access control may include permission to read, write, and/or modify information, e.g., a stored set of vehicle events.

Scenario component 25 may be configured to obtain and/or control access to a set of vehicle event scenarios 15 that correspond to vehicle events. In some implementations, scenario component 25 may be configured to create vehicle event scenarios and/or add vehicle event scenarios to set of vehicle event scenarios 15. For example, scenario component 25 may be configured to create vehicle event scenarios that are based on (detected) vehicle events. Individual vehicle event scenarios may correspond to individual vehicle events. The individual vehicle events may be associated with physical surroundings of one or more individual vehicles. For example, an individual vehicle event may be associated with a set of physical surroundings of the individual vehicle around the time of an individual vehicle event.

The individual vehicle event scenarios may be associated with circumstances. For example, an individual vehicle event scenario may be associated with a set of circumstances that is based on a set of physical surroundings, i.e., the set of physical surroundings of the individual vehicle around the time of the corresponding individual vehicle event. For example, a vehicle event scenario may have a scenario time period that begins prior to an occurrence of a potential vehicle event. For example, a particular vehicle event scenario may correspond to and/or be based on a real-life vehicle event of a vehicle accident. The corresponding vehicle event scenario may present the same or a similar driving situation that preceded the vehicle accident. However, if a vehicle operator would act differently when presented with the particular vehicle event scenario, a vehicle event (e.g., an accident) may be prevented and/or preventable. Accordingly, a vehicle event scenario may correspond to a potential vehicle event.

The individual vehicle event scenarios may include individual geographical locations. In some implementations, scenario component 25 may be configured to add one or more vehicle event scenarios to set of vehicle event scenarios 15. In some implementations, scenario component 25 may be configured to remove one or more vehicle event scenarios from set of vehicle event scenarios 15. In some implementations, set of vehicle event scenarios 15 may include vehicle event scenarios based on real-life vehicle events that have been detected at some time. In some implementations, set of vehicle event scenarios 15 may include vehicle event scenarios that are not based on real-life vehicle events, but rather created artificially, e.g., by human programming.

Link component 30 may be configured to establish links between vehicle operators and one or more simulation engines. In some implementations, a vehicle operator may be a human vehicle operator. Alternatively, and/or simultaneously, in some implementations, a vehicle operator may be an autonomous driving algorithm. In some implementations, actions by a particular vehicle operator may combine human actions and autonomous actions. In some implementations, a link between a vehicle operator and a simulation engine may include a communication link. In some implementations, a communication link may provide a vehicle operator with control over operations of a simulated vehicle.

Scenario component 25 may be configured to obtain and/or control access to a set of vehicle event scenarios 15 that correspond to vehicle events. In some implementations, scenario component 25 may be configured to create vehicle event scenarios and/or add vehicle event scenarios to set of vehicle event scenarios 15.

Simulation component 31 may be configured to obtain and/or control access to a set of simulation scenarios 16 that correspond to vehicle event scenarios. In some implementations, simulation component 31 may be configured to create simulation scenarios that are suitable for use by simulation engines and/or add simulation scenarios to set of simulation scenarios 16. In some implementations, simulation component 31 may be configured to run one or more simulation scenarios in a simulation engine, e.g., set of simulation scenarios 16. In some implementations, simulation component 31 may be configured to run set of simulation scenarios 16 at faster-than-real-time, meaning that the simulation of a scenario that would span 1 minute in real time may be performed in 1 second or less, for example.

Individual simulation scenarios may correspond to individual vehicle event scenarios. Individual simulation scenarios may mimic and/or be based on the circumstances associated with corresponding individual vehicle event scenarios. For example, an individual simulation scenario may mimic and/or be based on a set of circumstances associated with an individual vehicle event scenario. In some implementations, the simulated vehicle may be based on the individual vehicle of the individual vehicle event that corresponds to the individual vehicle event scenario. A simulation scenario may be used to train and/or test vehicle operators (including but not limited to autonomous driving algorithms).

Figure 3:
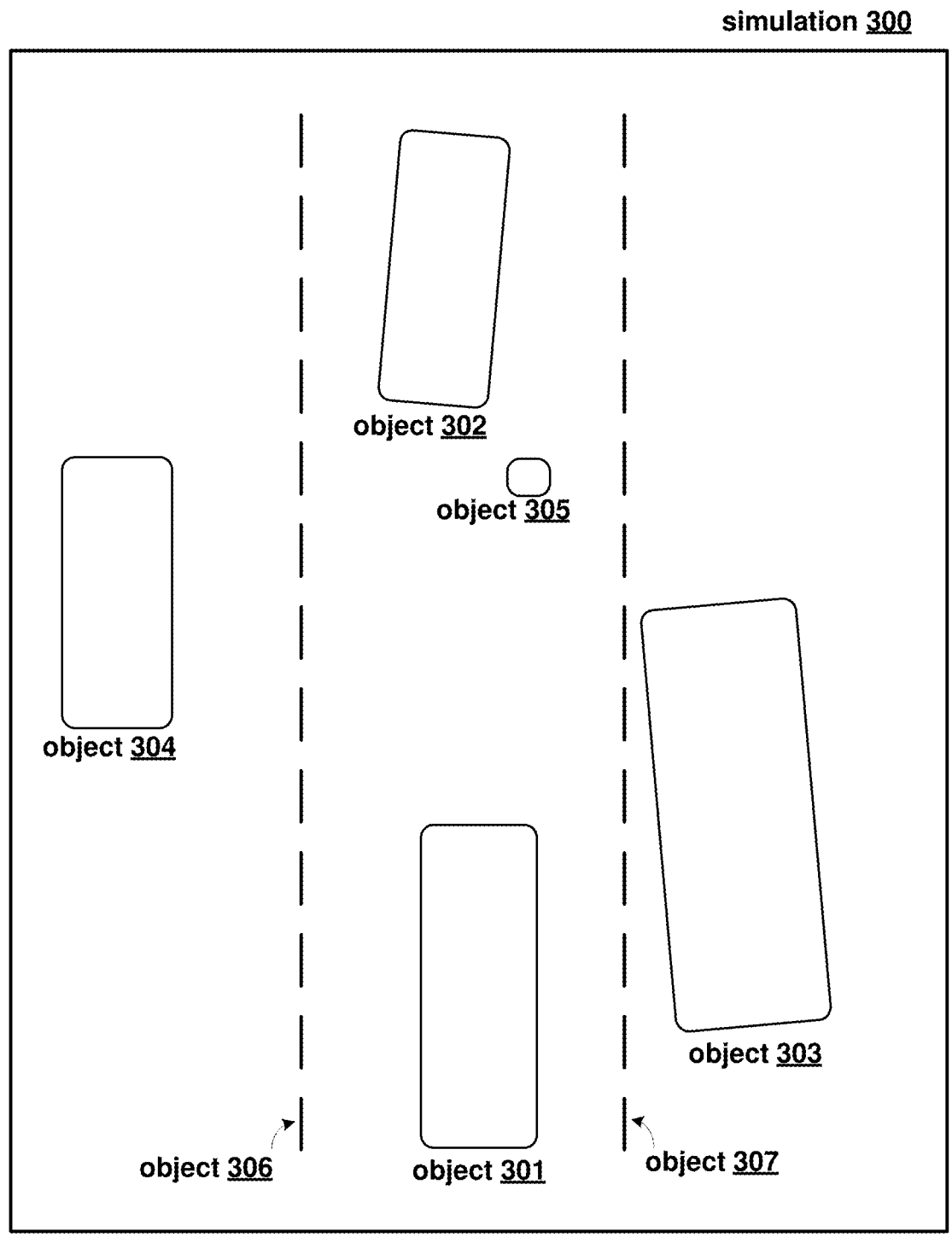
FIG. 3 illustrates an exemplary simulation that can be used by a system configured to determine driving performance by a vehicle operator for simulated driving of a simulated vehicle in a simulation engine, in accordance with one or more embodiments.

By way of non-limiting example, FIG. 3 illustrates an exemplary simulation 300, shown in a top view, that can be used by a system configured to determine driving performance by a vehicle operator for simulated driving of a simulated vehicle in a simulation engine. Simulation 300 may correspond to a particular vehicle event scenario that in turn may correspond to a particular vehicle event as described in relation to FIG. 2. Simulation 300 may represent a simulation scenario that mimics the circumstances associated with the particular vehicle event scenario. Simulation 300 may include simulated objects that are based on the physical surroundings associated with the particular vehicle event. For example, as depicted in FIG. 3, simulation 300 may include an object 301, an object 302, an object 303, an object 304, an object 305, an object 306, and object 307, and/or other simulated objects. Simulated objects may be based on the physical surroundings described and/or depicted in FIG. 2. For example, object 301 may be based on vehicle 201, object 302 may be based on vehicle 202, object 303 may be based on vehicle 203, object 304 may be based on vehicle 204, object 305 may be based on pothole 205, object 306 may be based on lane markings 206, object 307 may be based on lane markings 207, and so forth. Simulation 300 as depicted may represent a snapshot of a simulated sequence or timeline in which each object acts independently. A vehicle operator interacting with simulation 300 may control one or more objects, such as object 301, object 304, and/or other objects. Immediately following this snapshot, one or more simulated vehicle events (or potential vehicle events) may occur. Corresponding to the examples described in relation to FIG. 2, in a first simulated vehicle event, a vehicle operator may simulate the first example, in which vehicle 201 brakes sufficiently hard to exceed a deceleration threshold, perhaps due to vehicle 202 braking suddenly. In a second simulated vehicle event, a vehicle operator may simulate the second example, in which vehicle 201 swerves to avoid a collision with vehicle 203 as vehicle 203 crosses lane markings 207. In a third simulated vehicle event, a vehicle operator may simulate the third example, in which vehicle 201 swerves across lane markings 206 and rear-ends vehicle 204 (note that the vehicle operator may control either object 301 (based on vehicle 201), object 304 (based on vehicle 204), and/or another object or simulated vehicle.

The physical surroundings of vehicle 201 and object 301 are not limited to the two-dimensional depiction in FIGS. 2 and 3. Rather, the physical surroundings may be three-dimensional. For example, a set of image sensors may provide 360-degree visual information around vehicle 201 over time, including any of the parameters and/or conditions described here as part of the physical surroundings, as well as other parameters and/or conditions described herein. By determining, deriving, and/or otherwise generating this information at the time of a detected vehicle event, a simulation scenario may be created that is similar to the driving situation that lead to the detected vehicle event. Such a simulation scenario may be used to train and/or test vehicle operators.

In some implementations, some or all of the functionality attributed to scenario component 25 may be incorporated in other components of system 100, including but not limited to simulation component 31. For example, in some implementations, simulation component 31 may be configured to create simulation scenarios that correspond to detected vehicle events and are based on the physical surroundings of the detected vehicle events.

Performance component 26 may be configured to determine one or more metrics that quantify a performance of a vehicle operator in running one or more simulation scenarios. In some implementations, a metric may be reduced responsive to an individual one of the set of simulation scenarios resulting in a preventable accident. In some implementations, a metric may represent a ratio of a first set of simulation scenarios and a second set of simulation scenarios. For example, the first set may have resulted in preventable accidents and the second set may have completed without preventable accidents. In some implementations, individual scenarios may be rated for difficulty. For example, a metric may represent a score that reflects the difficulty of the scenario. For example, causing an accident during a simple (e.g., a low rated) scenario may affect the metric in a worse manner than causing an accident during a difficult (e.g., high rated) scenario. In some implementations, performance component 26 may be configured to compare one or more determined metrics for different vehicle operators. In some implementations, performance component 26 may be configured to determine which vehicle operator performed better out of a set of vehicle operators, and such a determination may be based on comparison of one or more metrics. In some implementations, performance may be multi-faceted, such that a first vehicle operator may outperform a second vehicle operator in a first set or type of simulation scenarios, while at the same time the second vehicle operator may outperform the first vehicle operator in a different set or type of simulation scenarios. In some implementations, modifications of the algorithms that control vehicle operators may be guided by determined metrics.

In some implementations, performance component 26 may be configured to determine one or more metrics that quantify a performance of a benchmark autonomous driving algorithm. The performance for other vehicle operators may be determined by comparing the performance to the benchmark performance. In some implementations, the performance of two separate autonomous driving algorithms may be determined and subsequently compared by using the same set of simulation scenarios for both.

Storage component 29 may be configured to store information in electronic storage. For example, the information may be stored in the electronic storage of a particular vehicle. In some implementations, the stored information may be related to detected vehicle events, determined vehicle parameters, executable code, and/or other information. For example, stored information may be associated with detected vehicle events, and include information regarding the physical surroundings in which the particular vehicle was operating at the time of the detected vehicle events. In some implementations, storage component 29 may be configured to store vehicle event records of detected vehicle events in electronic storage.

Report component 24 may be configured to generate event reports associated with one or more of generated output signals, detected vehicle events, information regarding physical surroundings of vehicles, responses to queries, results from executable code, and/or other information. In some implementations, report component 24 may be configured to publish event reports, e.g. by posting it online or through other mechanisms that effectuate publication. In some implementations, report component 24 may be configured to transfer event reports to users, third parties, and/or other entities interested in one or more of the vehicles, their routes, or their contents/cargo. Event reports may include information captured by image sensors during detected vehicle events. In some implementations, event reports may include information that is derived from and/or based on information captured by image sensors during detected vehicle events.

In some implementations, one or more components of system 100 may be configured to obtain, receive, and/or determine contextual information related to environmental conditions near and/or around vehicles. Environmental conditions may be related to weather conditions, road surface conditions, traffic conditions, visibility (e.g., position of the sun, occurrence of fog, glare or reflections into the cabin of the vehicle, headlights of oncoming traffic, etc.), and/or other environmental conditions. In some implementations, environmental conditions may be related to proximity of certain objects that are relevant to driving, including but not limited to traffic signs, railroad crossings, time of day, ambient light conditions, altitude, and/or other objects relevant to driving. In some implementations, contextual information may include a likelihood of traffic congestion near a particular vehicle, and/or near a particular location. In some implementations, contextual information may include a likelihood of the road surface near a particular vehicle and/or a particular location being icy, wet, and/or otherwise potentially having an effect of braking. In some implementations, environmental conditions may include information related to a particular driver and/or a particular trip.

For example, with every passing hour that a particular driver drives his vehicle during a particular trip, the likelihood of drowsiness may increase. In some implementations, the function between trip duration or distance and likelihood of drowsiness may be driver-specific.

In some implementations, one or more environmental conditions may be received from one or more sources external to the vehicle. For example, a source external to the vehicle may include one or more external providers 18. For example, contextual information related to weather conditions may be received from a particular external provider 18 that provides weather information. For example, contextual information related to road surface conditions may be received from a particular external provider 18 that provides road condition information. For example, contextual information related to traffic conditions may be received from a particular external provider 18 that provides traffic information.

In some implementations, detection of vehicle events may further be based one or more types of contextual information. In some implementations, detection may be accomplished and/or performed at the vehicle. In some implementations, a value of a current operating condition that effectuates detection of a vehicle event and/or determination of an event type may vary as a function of the contextual information. For example, a speed of 50 mph (in a particular geographical location) may not effectuate detection of a vehicle event and/or determination of an event type when the road surface is dry and/or when traffic is light, but the same speed in the same geographical location may effectuate detection of a vehicle event and/or determination of an event type responsive to contextual information and/or other information indicating that the road surface is wet and/or icy (and/or may be wet and/or icy), or responsive to contextual information (and/or other information) that traffic is heavy (and/or may be heavy). In this example, the contextual information (and/or other information) may have an effect of the detection of vehicle events and/or the determination of event types. In some implementations, contextual information (and/or other information) may modify the sensitivity of the process and/or mechanism by which vehicle events are detected and/or event types are determined. In some implementations, detection of vehicle events and/or determination of event types may be based on one or more comparisons of the values of current operating conditions with threshold values. In some implementations, a particular threshold value may vary as a function of contextual information. In some implementations, a particular threshold value may vary as a function of other information, e.g. as determined based on sensor output.

By way of non-limiting example, lateral forces of about −0.3 g (e.g., swerve left) and/or about +0.3 g (e.g., swerve right) may be a basis used to detect a swerve. In some implementations, the −0.3 g and/or +0.3 g criteria may be used at the vehicle speeds less than about 10 kph. The −0.3 g and/or +0.3 g criteria may be scaled as the vehicle increases in speed. In some implementations, the −0.3 g and/or +0.3 g criteria may be scaled (e.g., reduced) by about 0.0045 g per kph of speed over 10 kph. To prevent too much sensitivity, the lateral force criteria may be limited to about +/−0.12 g, regardless of the speed of the vehicle, for example. In some implementations, the criterion for the given period of time between swerves may be about 3 seconds.

Electronic storage 119 may comprise electronic storage media that electronically stores information. The electronic storage media of electronic storage 119 may comprise one or both of system storage that is provided integrally (i.e., substantially non-removable) with system 100 and/or removable storage that is removably connectable to system 100 via, for example, a port (e.g., a USB port, a firewire port, etc.) or a drive (e.g., a disk drive, etc.). Electronic storage 119 may comprise one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 119 may store software algorithms, recorded video event data, information determined by processor 104, information received via an interface, and/or other information that enables system 100 to function properly. Electronic storage 119 may be (in whole or in part) a separate component within system 100, or electronic storage 119 may be provided (in whole or in part) integrally with one or more other components of system 100.

As described above, processor 104 may be configured to provide information-processing capabilities in system 100. As such, processor 104 may comprise one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may comprise a plurality of processing units. These processing units may be physically located within the same device (e.g., a vehicle event recorder), or processor 104 may represent processing functionality of a plurality of devices operating in coordination.

Processor 110 may be configured to execute components 21-31 by software; hardware; firmware; some combination of software, hardware, and/or firmware; and/or other mechanisms for configuring processing capabilities on processor 110. It should be appreciated that although components 21-31 are illustrated in FIG. 1 as being co-located within a single processing unit, in implementations in which processor 104 comprises multiple processing units, one or more of components 21-31 may be located remotely from the other components. The description of the functionality provided by the different components 21-31 described herein is for illustrative purposes, and is not intended to be limiting, as any of components 21-31 may provide more or less functionality than is described. For example, one or more of components 21-31 may be eliminated, and some or all of its functionality may be provided by other components 21-31. As another example, processor 104 may be configured to execute one or more additional components that may perform some or all of the functionality attributed below to one of components 21-31.

Figure 4:
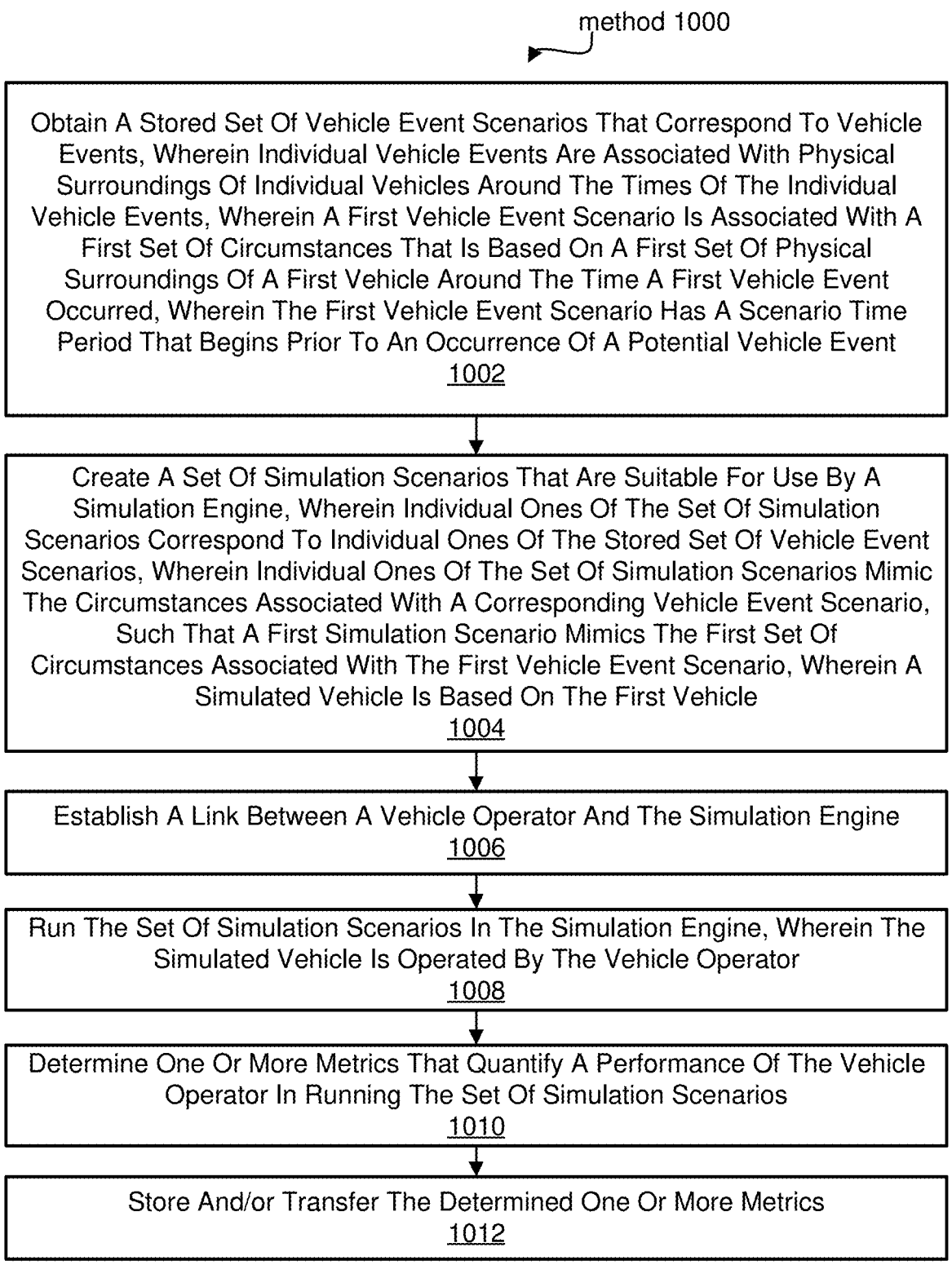
FIGS. 4-5 illustrate methods to determine driving performance by a vehicle operator for simulated driving of a simulated vehicle in a simulation engine, in accordance with one or more embodiments.
Figure 5:
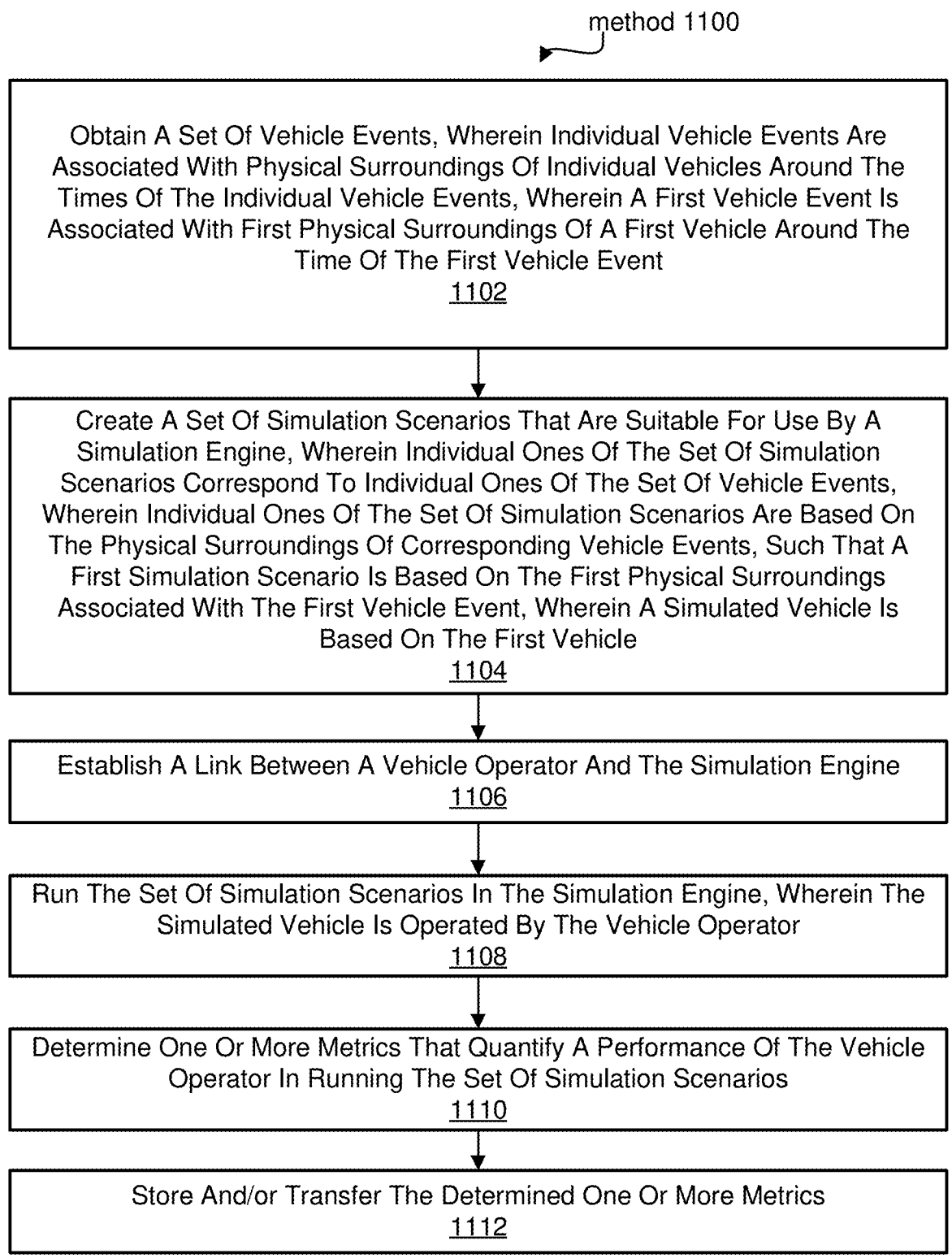

FIGS. 4-5 illustrate method 1000-1100 to determine driving performance by a vehicle operator for simulated driving of a simulated vehicle in a simulation engine. The operations of methods 1000-1100 presented below are intended to be illustrative. In some implementations, methods 1000-1100 may be accomplished with one or more additional operations not described, and/or without one or more of the operations discussed. Additionally, the order in which the operations of methods 1000-1100 are illustrated and described below is not intended to be limiting. In some implementations, two or more of the operations may occur substantially simultaneously.

In some implementations, methods 1000-1100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 1000-1100 in response to instructions stored electronically on one or more electronic storage mediums. The one or more processing devices may include one or more devices configured through hardware, firmware, and/or software to be specifically designed for execution of one or more of the operations of methods 1000-1100.

Referring to FIG. 4 and method 1000, at an operation 1002, a stored set of vehicle event scenarios is obtained that correspond to vehicle events. Individual vehicle events are associated with physical surroundings of individual vehicles around the times of the individual vehicle events. A first vehicle event scenario is associated with a first set of circumstances that is based on a first set of physical surroundings of a first vehicle around the time a first vehicle event occurred. The first vehicle event scenario has a scenario time period that begins prior to an occurrence of a potential vehicle event. In some embodiments, operation 1002 is performed by a scenario component the same as or similar to scenario component 25 (shown in FIG. 1 and described herein).

At an operation 1004, a set of simulation scenarios is created that are suitable for use by the simulation engine. Individual ones of the set of simulation scenarios correspond to individual ones of the stored set of vehicle event scenarios. Individual ones of the set of simulation scenarios mimic the circumstances associated with a corresponding vehicle event scenario, such that a first simulation scenario mimics the first set of circumstances associated with the first vehicle event scenario. The simulated vehicle is based on the first vehicle. In some embodiments, operation 1004 is performed by a simulation component the same as or similar to simulation component 31 (shown in FIG. 1 and described herein).

At an operation 1006, a link is established between the vehicle operator and the simulation engine. In some embodiments, operation 1006 is performed by a link component the same as or similar to link component 30 (shown in FIG. 1 and described herein).

At an operation 1008, the set of simulation scenarios is run in the simulation engine. The simulated vehicle is operated by the vehicle operator. In some embodiments, operation 1008 is performed by a simulation component the same as or similar to simulation component 31 (shown in FIG. 1 and described herein).

At an operation 1010, one or more metrics are determined that quantify a performance of the vehicle operator in running the set of simulation scenarios. In some embodiments, operation 1010 is performed by a performance component the same as or similar to performance component 26 (shown in FIG. 1 and described herein).

At an operation 1012, the determined one or more metrics are stored and/or transferred. In some embodiments, operation 1012 is performed by a storage component and/or a distribution component the same as or similar to storage component 29 and/or distribution component 23 (shown in FIG. 1 and described herein).

Referring to FIG. 5 and method 1100, at an operation 1102, a set of vehicle events is obtained. Individual vehicle events are associated with physical surroundings of individual vehicles around the times of the individual vehicle events. A first vehicle event is associated with first physical surroundings of a first vehicle around the time of a first vehicle event. In some embodiments, operation 1102 is performed by an event detection component the same as or similar to event detection component 28 (shown in FIG. 1 and described herein).

At an operation 1104, a set of simulation scenarios is created that are suitable for use by the simulation engine. Individual ones of the set of simulation scenarios correspond to individual ones of the set of vehicle events. Individual ones of the set of simulation scenarios are based on the physical surroundings of corresponding vehicle events, such that a first simulation scenario is based on the first physical surroundings associated with the first vehicle event. The simulated vehicle is based on the first vehicle. In some embodiments, operation 1104 is performed by a simulation component the same as or similar to simulation component 31 (shown in FIG. 1 and described herein).

At an operation 1106, a link is established between the vehicle operator and the simulation engine. In some embodiments, operation 1106 is performed by a link component the same as or similar to link component 30 (shown in FIG. 1 and described herein).

At an operation 1108, the set of simulation scenarios is run in the simulation engine. The simulated vehicle is operated by the vehicle operator. In some embodiments, operation 1108 is performed by a simulation component the same as or similar to simulation component 31 (shown in FIG. 1 and described herein).

At an operation 1110, one or more metrics are determined that quantify a performance of the vehicle operator in running the set of simulation scenarios. In some embodiments, operation 1110 is performed by a performance component the same as or similar to performance component 26 (shown in FIG. 1 and described herein).

At an operation 1112, the determined one or more metrics are stored and/or transferred. In some embodiments, operation 1112 is performed by a storage component and/or a distribution component the same as or similar to storage component 29 and/or distribution component 23 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to determine driving performance by a vehicle operator and by a second vehicle operator for simulated driving of a simulated vehicle in a simulation engine, wherein the vehicle operator and the second vehicle operator are included in a set of vehicle operators, wherein the simulated driving is based on real-world operation of real-world vehicles, the system comprising:

electronic storage configured to electronically store information; and one or more processors configured via machine-readable instructions to:

determine one or more vehicle parameters of individual vehicles, wherein the one or more vehicle parameters are determined directly based on output signals from at least two different sensors, wherein the one or more vehicle parameters are determined multiple times in an ongoing manner during operation of the vehicle;

obtain a stored set of vehicle event scenarios that correspond to vehicle events that have occurred in the real world at particular times during the real-world operation of the real-world vehicles, wherein individual vehicle events are associated with physical surroundings of individual vehicles around the particular times the individual vehicle events occurred, wherein individual vehicle events are detected based on comparing the one or more vehicle parameters of individual vehicles with one or more thresholds, wherein a first vehicle event scenario is associated with a first set of circumstances that is based on a first set of physical surroundings of a first vehicle around a particular time a first vehicle event occurred, wherein the first vehicle event scenario has a scenario time period that begins prior to an occurrence of a potential vehicle event;

create a set of simulation scenarios that are suitable for use by the simulation engine, wherein individual ones of the set of simulation scenarios correspond to individual ones of the stored set of vehicle event scenarios, wherein individual ones of the set of simulation scenarios mimic circumstances associated with a corresponding vehicle event scenario, such that a first simulation scenario mimics the first set of circumstances associated with the first vehicle event scenario, wherein the simulated vehicle is based on the first vehicle;

establish a communication link between the vehicle operator and the simulation engine, wherein the vehicle operator is an autonomous driving algorithm that controls operations of the simulated vehicle autonomously through the communication link;

run the set of simulation scenarios in the simulation engine, wherein the simulated vehicle interacts with the vehicle operator and is operated by the vehicle operator based on input received from the autonomous driving algorithm;

detect, by the simulation engine during the running of the set of simulation scenarios, one or more simulated vehicle events that have occurred to the simulated vehicle as the autonomous driving algorithm controlled the operations of the simulated vehicle;

determine one or more metrics that quantify a performance of the vehicle operator in running the set of simulation scenarios, wherein the determination of the one or more metrics is based on the one or more simulated vehicle events as detected;

establish a second communication link between the second vehicle operator and the simulation engine, wherein the second vehicle operator is a second autonomous driving algorithm that controls operations of the simulated vehicle autonomously through the second communication link;

run the set of simulation scenarios in the simulation engine, wherein the simulated vehicle interacts with the second vehicle operator and is operated by the second vehicle operator based on second input received from the second autonomous driving algorithm;

detect, by the simulation engine during the running of the set of simulation scenarios, a second set of simulated vehicle events that have occurred to the simulated vehicle as the second autonomous driving algorithm controlled the operations of the simulated vehicle;

determine a second set of metrics that quantify a second performance of the second vehicle operator running the set of simulation scenarios, wherein the determination of the second set of metrics is based on the second set of simulated vehicle events as detected;

compare the performance of the vehicle operator with the second performance of the second vehicle operator, wherein comparison is based on the one or more metrics and the second set of metrics;

based on the comparison, determine whether the vehicle operator or the second vehicle operator performed best in running the set of simulation scenarios; and generate a report based on the comparison and transfer the report to one or more users.

2. The system of claim 1, wherein the potential vehicle event corresponds to the first vehicle event.

3. The system of claim 1, wherein the second vehicle operator is a benchmark autonomous driving algorithm.

4. The system of claim 1, wherein individual ones of the stored set of vehicle event scenarios correspond to detected vehicle events in real life.

5. The system of claim 1. wherein the communication link provides the vehicle operator with control over the operations of the simulated vehicle.

6. The system of claim 1, wherein the simulation engine is computer-implemented and configured by a set of machine-readable instructions, and wherein the set of simulation scenarios in the simulation engine is run at faster-than-real-time.

7. The system of claim 1, wherein one of the one or more metrics is reduced responsive to an individual one of the set of simulation scenarios resulting in an accident.

8. The system of claim 1, wherein the one or more processors are further configured to take an action based on the comparison of the performance of the vehicle operator with the second performance of the second vehicle operator.

9. A method for determining driving performance by a vehicle operator and by a second vehicle operator for simulated driving of a simulated vehicle in a simulation engine, wherein the vehicle operator and the second vehicle operator are included in a set of vehicle operators, wherein the simulated driving is based on real-world operation of real-world vehicles, the method comprising:

determining one or more vehicle parameters of individual vehicles, wherein the one or more vehicle parameters are determined directly based on output signals from at least two different sensors, wherein the one or more vehicle parameters are determined multiple times in an ongoing manner during operation of the vehicle;

obtaining a stored set of vehicle event scenarios that correspond to vehicle events that have occurred in the real world at particular times during the real-world operation of the real-world vehicles, wherein individual vehicle events are associated with physical surroundings of individual vehicles around the particular times the individual vehicle events occurred, wherein individual vehicle events are detected based on comparing the one or more vehicle parameters of individual vehicles with one or more thresholds, wherein a first vehicle event scenario is associated with a first set of circumstances that is based on a first set of physical surroundings of a first vehicle around a particular time a first vehicle event occurred, wherein the first vehicle event scenario has a scenario time period that begins prior to an occurrence of a potential vehicle event;

creating a set of simulation scenarios that are suitable for use by the simulation engine, wherein individual ones of the set of simulation scenarios correspond to individual ones of the stored set of vehicle event scenarios, wherein individual ones of the set of simulation scenarios mimic circumstances associated with a corresponding vehicle event scenario, such that a first simulation scenario mimics the first set of circumstances associated with the first vehicle event scenario, wherein the simulated vehicle is based on the first vehicle;

establishing a communication link between the vehicle operator and the simulation engine, wherein the vehicle operator is an autonomous driving algorithm that controls operations of the simulated vehicle autonomously through the communication link;

running the set of simulation scenarios in the simulation engine, wherein the simulated vehicle interacts with the vehicle operator and is operated by the vehicle operator based on input received from the autonomous driving algorithm;

detecting, by the simulation engine during the running of the set of simulation scenarios, one or more simulated vehicle events that have occurred to the simulated vehicle as the autonomous driving algorithm controlled the operations of the simulated vehicle;

determining one or more metrics that quantify a performance of the vehicle operator in running the set of simulation scenarios, wherein the determination of the one or more metrics is based on the one or more simulated vehicle events as detected;

establishing a second communication link between the second vehicle operator and the simulation engine, wherein the second vehicle operator is a second autonomous driving algorithm that controls operations of the simulated vehicle autonomously through the second communication link;

running the set of simulation scenarios in the simulation engine, wherein the simulated vehicle interacts with the second vehicle operator and is operated by the second vehicle operator based on second input received from the second autonomous driving algorithm;

detecting, by the simulation engine during the running of the set of simulation scenarios, a second set of simulated vehicle events that have occurred to the simulated vehicle as the second autonomous driving algorithm controlled the operations of the simulated vehicle;

determining a second set of metrics that quantify a second performance of the second vehicle operator in running the set of simulation scenarios, wherein the determination of the second set of metrics is based on the second set of simulated vehicle events as detected;

comparing the performance of the vehicle operator with the second performance of the second vehicle operator, wherein comparison is based on the one or more metrics and the second set of metrics;

based on the comparison, determine whether the vehicle operator or the second vehicle operator performed best in running the set of simulation scenarios; and generating a report based on the comparison and transferring the report to one or more users.

10. The method of claim 9, wherein the potential vehicle event corresponds to the first vehicle event.

11. The method of claim 9, wherein the second vehicle operator is a benchmark autonomous driving algorithm.

12. The method of claim 9, wherein individual ones of the stored set of vehicle event scenarios correspond to detected vehicle events in real life.

13. The method of claim 9, wherein the communication link provides the vehicle operator with control over the operations of the simulated vehicle.

14. The method of claim 9, wherein the set of simulation scenarios in the simulation engine is run at faster-than-real-time.

15. The method of claim 9, wherein one of the one or more metrics is reduced responsive to an individual one of the set of simulation scenarios resulting in an accident.

16. The method of daim 9, wherein the report includes at least one of a warning and a recommendation reaarding the vehicle operator, and wherein at least one of the warning and the recommendation are based on at least one of the one or more metrics and the comparison.

* * * * *